Figures 1, 2:
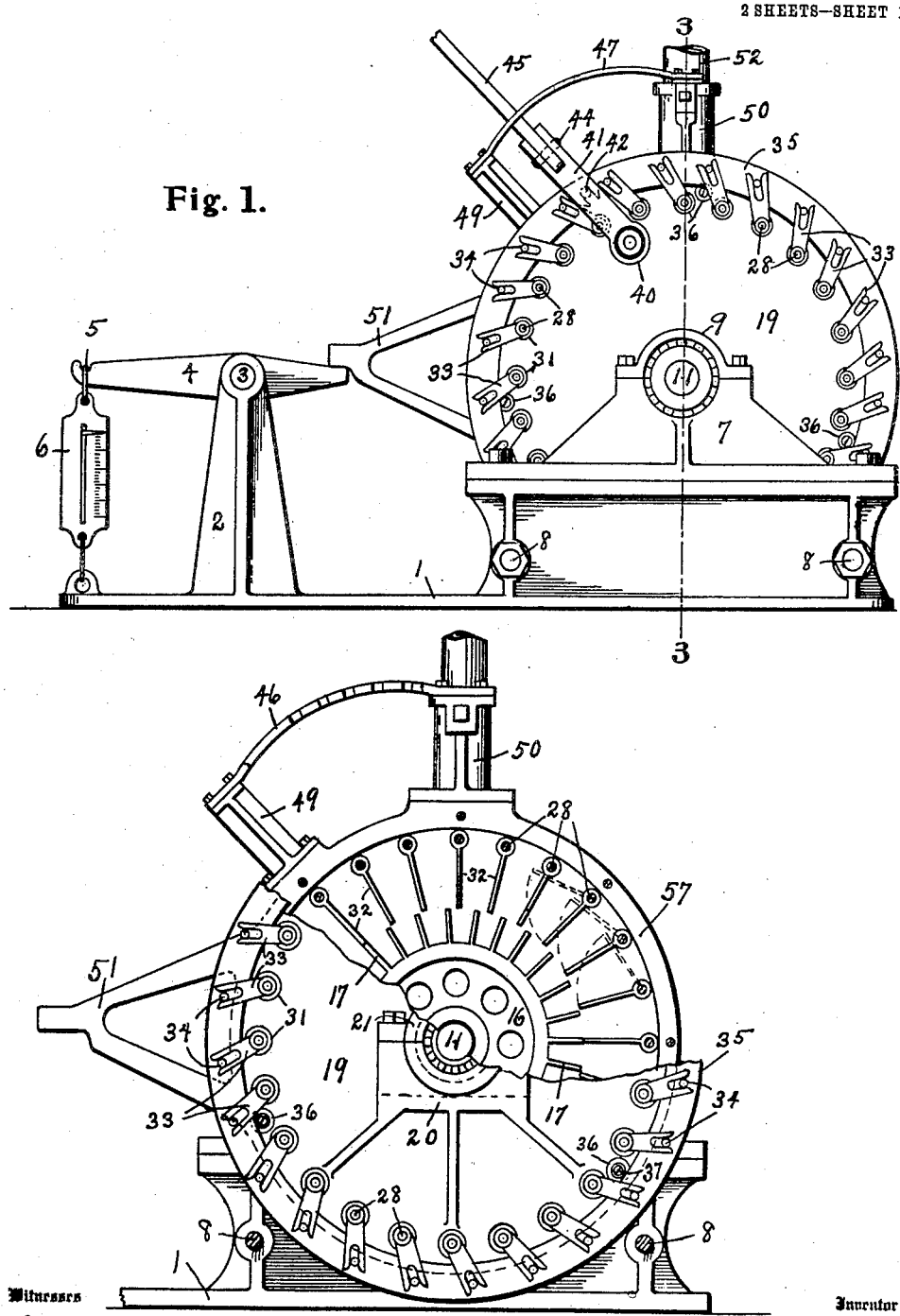

E. E. SWEET.
DYNAMOMETER.
APPLICATION FILED NOV. 12, 1908.

929,803.

Patented Aug. 3, 1909.
2 SHEETS—SHEET 1.

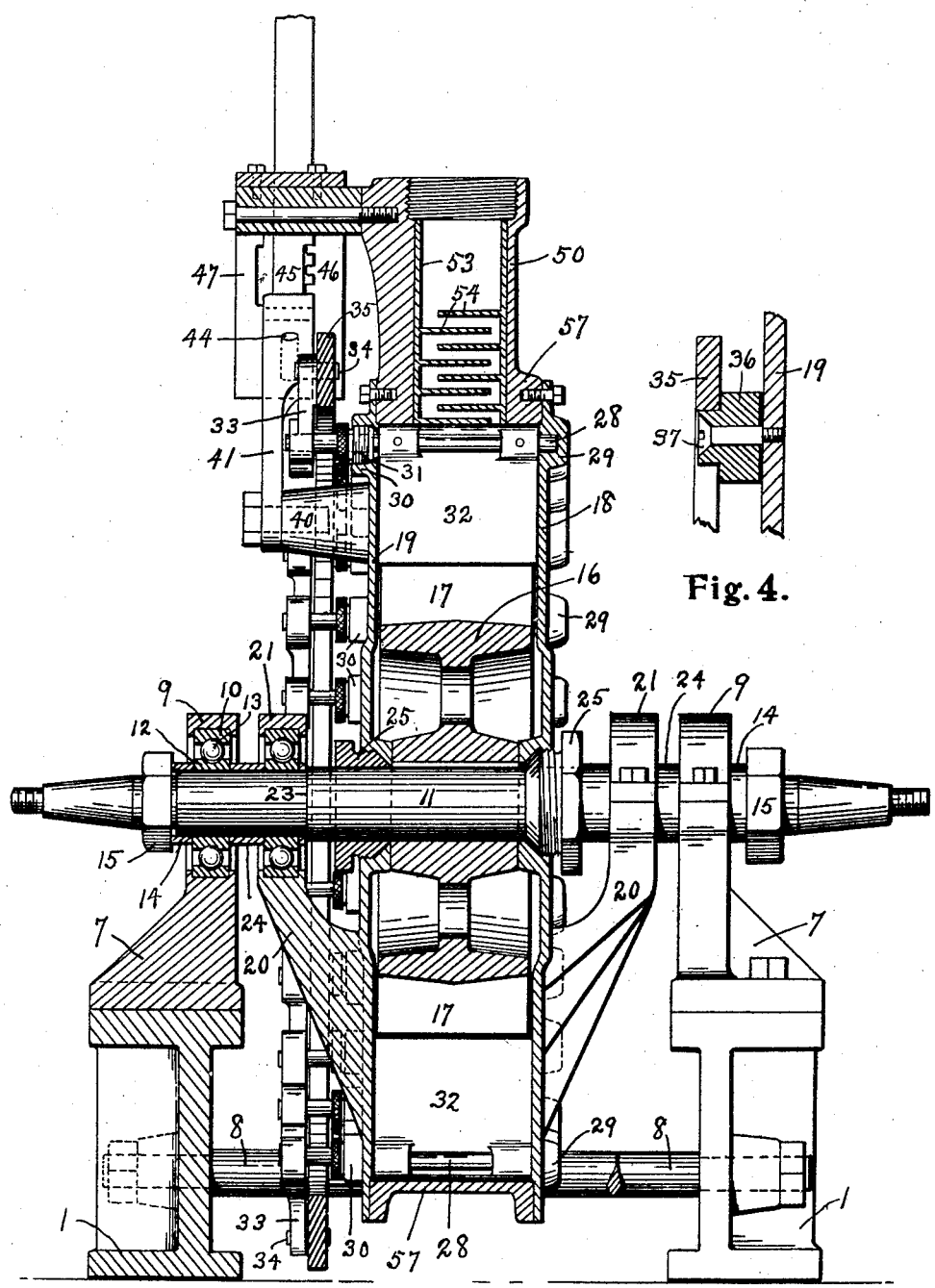

UNITED STATES PATENT OFFICE.

ERNEST E. SWEET, OF DETROIT, MICHIGAN, ASSIGNOR TO CADILLAC MOTOR CAR COMPANY, OF DETROIT, MICHIGAN, A CORPORATION OF MICHIGAN.

DYNAMOMETER.

No. 929,803.  Specification of Letters Patent.  Patented Aug. 3, 1909.

Application filed November 12, 1908. Serial No. 462,211.

*To all whom it may concern:*

Be it known that I, ERNEST E. SWEET, a citizen of the United States, and a resident of Detroit, in the county of Wayne and State of Michigan, have invented a new and Improved Dynamometer, of which the following is a specification.

My invention relates to machines for measuring the force expended in turning a shaft, and its object is to provide a simple and effective mechanism for determining the horse-power of primary motors.

This invention consists in a frame, a casing mounted therein, a shaft revoluble within the casing, a wheel on said shaft having a series of projections, a series of vanes within the casing, and means for determining the resistance offered by the casing to the revolution of the wheel therein when the casing is filled with a liquid and the shaft is revolved.

My invention further consists in the combination with the mechanism described, of means for altering the angular relation between the vanes and the projections on the wheel.

In the accompanying drawings Figure 1 is a side view of the power testing machine. Fig. 2 is a view on a somewhat larger scale of the casing with a portion of one head broken away. Fig. 3 is a vertical cross section on the line 3—3 of Fig. 1. Fig. 4 is a detail showing the support of the adjusting ring.

Similar reference characters refer to like parts throughout the several views.

In the drawing 1 and 1 are two halves of the bed to which are attached the standards 2. The standards are connected by the shaft 3, on which is mounted a lever 4, on one end of which is a link 5 connected to the indicator 6, or other mechanisms to indicate the pressure placed on the inner end of the lever. A frame 7 is secured to each part of bed 1, the two parts being properly spaced by the shouldered rods 8. The frames are provided with caps 9 and the frames and caps are grooved to receive the ball races or rings 10. A shaft 11 has secured to it the ball races 12 between which and the rings 10 are the series of bearing balls 13. The positions of the ball rings on the shaft are determined by the collar 14 and the nuts 15. The ends of the shaft 11 are shown formed to receive couplings, pulleys, gears or any other desirable portion of the machinery to communicate power thereto. Secured to the shaft 14 is a wheel 16 having radial vanes or buckets 17.

Surrounding the shaft and the spool 16 is a casing which is formed by an annular body 57 and the two heads 18 and 19. Projecting upward from the lower parts of the heads are the brackets 20, having caps 21 which secure similar ball races as those just described. It will thus be seen that the drum is freely revoluble on this shaft. The shaft is provided with a shoulder 23 by means of which and the sleeves 24, the drum is prevented from sliding endwise on the shaft.

Under normal conditions the head is filled with liquid and to prevent this from escaping each head is provided with a stuffing box 25 to close the aperture around the shaft. Mounted in both heads are a series of rods 28, one end of each of which is journaled in the head 18 which is provided with bosses 29 for this purpose. The other end of each rod is journaled in the hubs 30 which are provided with stuffing boxes 31 to insure tight joints. Secured to each rod 28 is a vane 32 which may be placed at varying angles with respect to the buckets 17 on the wheel 16. For this purpose levers 33 are secured to the rods 28 and have their ends bifurcated to receive the pins 34 carried by the ring 35. This ring is mounted on three rollers 36, carried on screws 37, mounted on the head 19. The levers 33 prevent the ring from slipping off these guide rollers.

Mounted on a boss 40 projecting from the head 19 is a lever 41 having an inwardly projecting slotted lug adapted to receive the pin 42 carried by the ring 35. Mounted on the pin 44 carried by this lever is a handle 45 which is adapted to move between the guide plates 46 and 47. These guide plates are mounted on a bracket 49 carried by the drum and on the inlet connection 50 of the drum. The guide 46 is notched as shown in Figs. 2 and 3 so that the handle 45 and lever 41 may be held in any desired position.

Projecting from the drum is a light arm 51, which is adapted to engage the end of the lever 4 and thereby transfer the stresses set up within the drum, by the revolution of the spool 16, to the indicator 6.

It will be readily noticed that when the drum is filled with any desirable liquid, which is not too thick, and the shaft 11 is revolved, that the liquid set in motion by the buckets 17 will exert a pull on the drum 17 through the vanes 32 and that the more nearly these vanes assume radial position, the greater will be the pull; and that the more nearly the vanes assume the position shown in dotted lines in Fig. 2 the less will be the pull. The indicator 6 may be calibrated to indicate the power expended for a certain fixed number of revolutions of the shaft 11 and the position of the lever 41 will determine to a large extent this power expended. The revolutions of the shaft may be counted in any desirable manner.

As the revolutions of the spool 16 will have a tendency to expel the liquid through the connection 50 it may be necessary for extreme speeds to connect a stand pipe 52 at the upper end. To prevent too rapid a flow of liquid through this connection a sleeve 53 having cross vanes 54 may be employed.

This mechanism provides a variable internal resistance for dynamometers of this type and for given speeds for the same positions of the lever 42 the indicator 6 will be at rest.

Many changes may be made in the details of this machine without avoiding the spirit of my invention.

Having now explained my improvements, what I claim as my invention and desire to secure by Letters Patent is:—

1. In a dynamometer, the combination of a base, bearings mounted thereon, a shaft freely revoluble in said bearings, a wheel attached to the shaft and provided with flat radial buckets, a casing inclosing the wheel and comprising a cylindrical body and two heads, brackets attached to said heads and provided with bearings mounted on said shaft, stems mounted in said casing, vanes within the casing attached to said stems, levers on said stems outside of the casing, a ring mounted on the casing and provided with pins to engage the levers, a handle for positioning the ring, means to hold the handle in a plurality of positions, and means to indicate the stresses on the casing caused by the revolution of the shaft.

2. In a dynamometer, the combination of a revoluble shaft, means to support the same, a wheel attached to the shaft and provided with flat buckets, a casing revolubly mounted on the shaft and inclosing the wheel, stems mounted in the casing, vanes attached to the stems, and means for holding the vanes in a plurality of positions.

3. In a dynamometer, the combination of a frame, a shaft revolubly mounted thereon, a wheel on said shaft provided with projections, an oscillatory casing mounted on said shaft, adjustable vanes mounted in said casing, and means to adjust the vanes.

4. In a dynamometer, the combination of a revoluble member, a casing inclosing the same adapted to hold a liquid, adjustable means to control the resistance of the casing to the revoluble member because of the liquid, a connection to said casing to admit the liquid, and baffle plates in the connection to hinder the flow of the liquid.

5. In a dynamometer, the combination of a revoluble member, a relatively stationary member inclosing the same and adapted to hold a liquid, a series of adjustable members to control the resistance of the casing to the revoluble member because of the liquid, and means for simultaneously positioning all of the adjustable members.

In testimony whereof, I have signed this specification in the presence of two subscribing witnesses.

ERNEST E. SWEET.

Witnesses:
  Wm. I. Nash,
  C. B. Eldredge.